Oct. 8, 1929.  E. G. WALBRIDGE  1,730,796
BURNER
Filed July 13, 1927
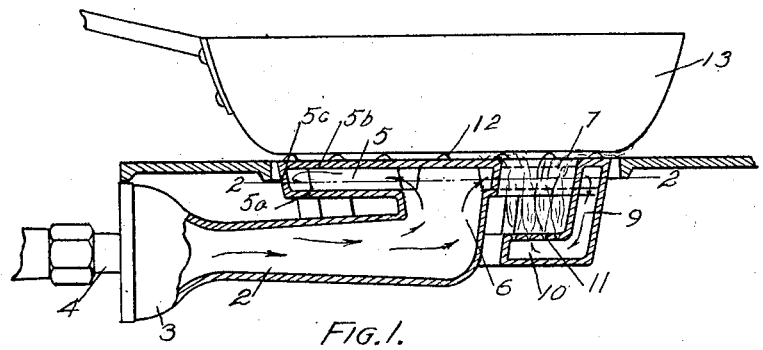
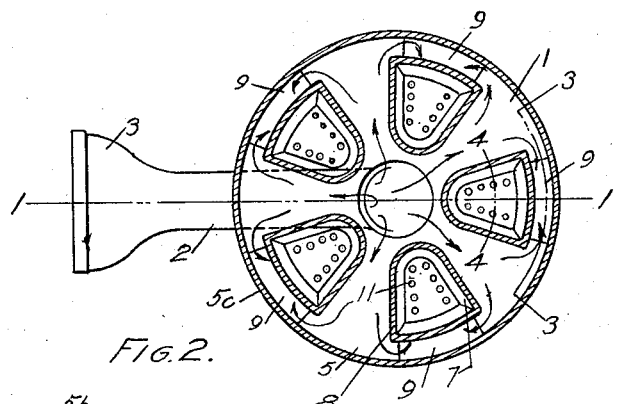
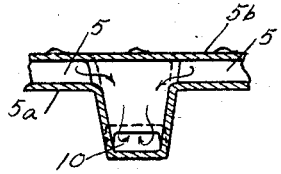
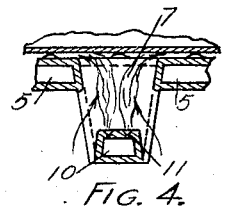
Earl G. Walbridge
INVENTOR.
BY
ATTORNEYS.

Patented Oct. 8, 1929

1,730,796

UNITED STATES PATENT OFFICE

EARL G. WALBRIDGE, OF ERIE, PENNSYLVANIA

BURNER

Application filed July 13, 1927. Serial No. 205,475.

The present invention is intended to improve gas burners, particularly such gas burners as are used in cook stoves, hot plates, and the like. It consists in forming the burner so that the gas is carried through a heated part of the burner as jets. At the same time, the burner allows ample air space for providing air for combustion and also is of a construction which can be readily produced. Features and details of the invention will appear from the specification and claims.

A preferred exemplification of the invention is illustrated in the accompanying drawings as follows:—

Fig. 1 shows a section on the line 1—1 in Fig. 2.

Fig. 2 a section on the line 2—2 in Fig. 1.

Fig. 3 a section on the line 3—3 in Fig. 2.

Fig. 4 a section on the line 4—4 in Fig. 2.

1 marks the burner as a whole. To this the mixer tube 2 leads. A mixer 3 opens to the burner and gas is supplied through a gas pipe 4 in the usual manner.

The upper part of the burner has a heating chamber 5. This has the bottom wall $5^a$, the upper wall $5^b$, and the peripheral wall $5^c$.

The mixer tube 2 has an up-turned portion 6 at the center which leads to the center of the chamber 5.

Openings 7 extend through the heating chamber. These openings are grouped around the burner. The openings are surrounded by walls 8 so that they are separated from the chamber. Passages 9 are arranged between the outer walls 8 of the openings 7 and the periphery and these passages extend downwardly to a point below the heating chamber and burner chambers 10 project inwardly from the walls of the passages 9 and these are provided with jet perforations 11. It will be noted that the upper faces of the burner with these jets are directly beneath the openings 7 and the flame from the burner passes up through the openings. The upper face of the burner is provided with small projections 12 which support a receptacle, as 13, slightly above the burner. It will be noted that the space between the burners gives ample air access to the flame and the flame as it is carried up through the openings and around the walls of the chamber 5 heat the incoming gas. It will also be noted that the form of the burner is such that it may be made from an integral casting and thus the fitting, or machining, very much reduced and leakage prevented.

What I claim as new is:—

1. A gas burner having a heating chamber with flame openings therethrough; burner elements with jet perforations beneath the respective openings; connections forming communications between the chamber and the burner elements; and a supply connection leading to the heating chamber.

2. A gas burner having a heating chamber with flame openings therethrough; burner elements with jet perforations beneath the respective openings; connections forming communications between the chamber and the burner elements; and a supply connection leading to the heating chamber, said burner elements being separated, affording open spaces therebetween.

3. An integral gas burner having a heating chamber with flame openings therethrough; burner elements with jet perforations beneath the respective openings; connections forming communications between the chamber and the burner elements; and a supply connection leading to the heating chamber.

4. A gas burner having a heating chamber with flame openings therethrough and downwardly extending passages leading from the heating chamber; burner elements connected with and extending laterally from the passages, said burner elements having jet perforations beneath the respective flame openings; and means for supplying fuel to the heating chamber.

5. A burner having a heating chamber with openings therethrough; passages extending downwardly from the heating chamber adjacent to the openings; and burner chambers extending laterally from the passages to beneath the openings, said burner chambers having jet perforations; and a supply tube leading to the heating chamber.

6. A gas burner having a heating chamber with openings therethrough; downwardly extending passages extending from the heating chamber between the openings and the outer periphery of the heating chamber; burner chambers extending inwardly from the passages beneath the openings, said burner chambers having jet perforations; and means for supplying fuel to the heating chamber.

In testimony whereof I have hereunto set my hand.

EARL G. WALBRIDGE.